United States Patent [19]

Fine

[11] Patent Number: 5,794,420
[45] Date of Patent: Aug. 18, 1998

[54] NOSE SHADE

[76] Inventor: Stephany Ann Fine, P.O. Box 558, Tucker, Ga. 30084

[21] Appl. No.: 788,328

[22] Filed: Jan. 27, 1997

[51] Int. Cl.[6] ............................. B68C 5/00; A01K 13/00
[52] U.S. Cl. ............................................. 54/80.3; 119/850
[58] Field of Search ................................. 54/80.3, 80.4, 54/80.5; 119/850

[56] References Cited

U.S. PATENT DOCUMENTS

| 1,459,601 | 6/1923 | Orstad | 54/80.3 |
| 3,609,941 | 10/1971 | Eldredge | 54/80.3 |

FOREIGN PATENT DOCUMENTS

| 727797 | 11/1942 | Germany | 54/80.3 |

*Primary Examiner*—Robert P. Swiatek
*Attorney, Agent, or Firm*—Peter Loffler

[57] ABSTRACT

A shade for protecting an animal's nose from sun burn is comprised of a scoop-shaped cover that is a webbing, having any desired light transmission capability value, encompassed by a bias tape. The cover can be positioned onto a horse, for example, by providing a retainer that is comprised of a head stall extending between the cover's corners. A throat strap extends from one portion of the head stall to another portion. A chin strap extends from one corner of the cover to the other corner of the cover. A pair of cheek straps and a restriction strap are also provided. Alternately, the cover can be secured, either fixedly or removably, to a bridle, halter, or fly mask.

19 Claims, 5 Drawing Sheets

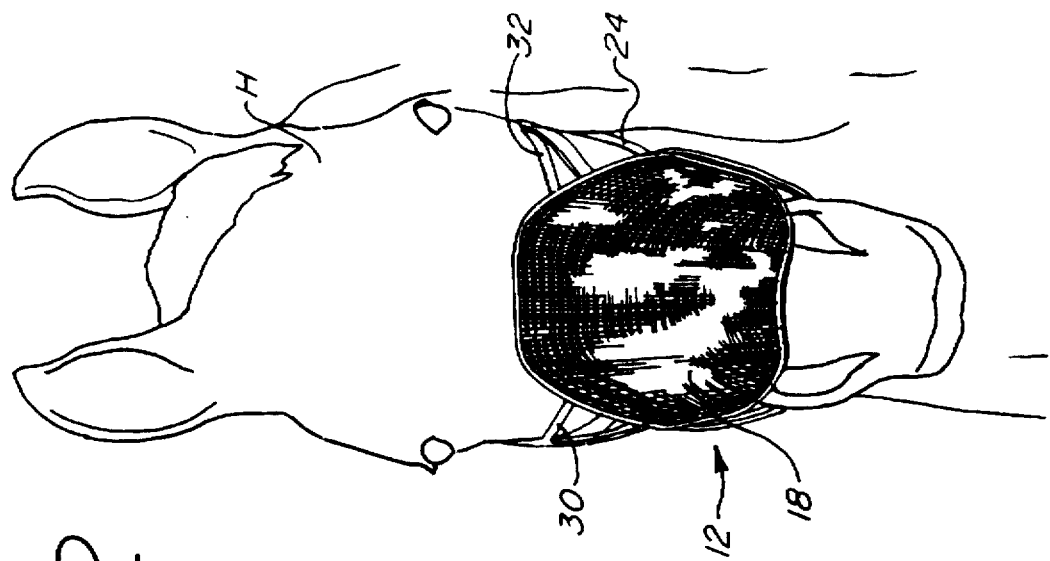
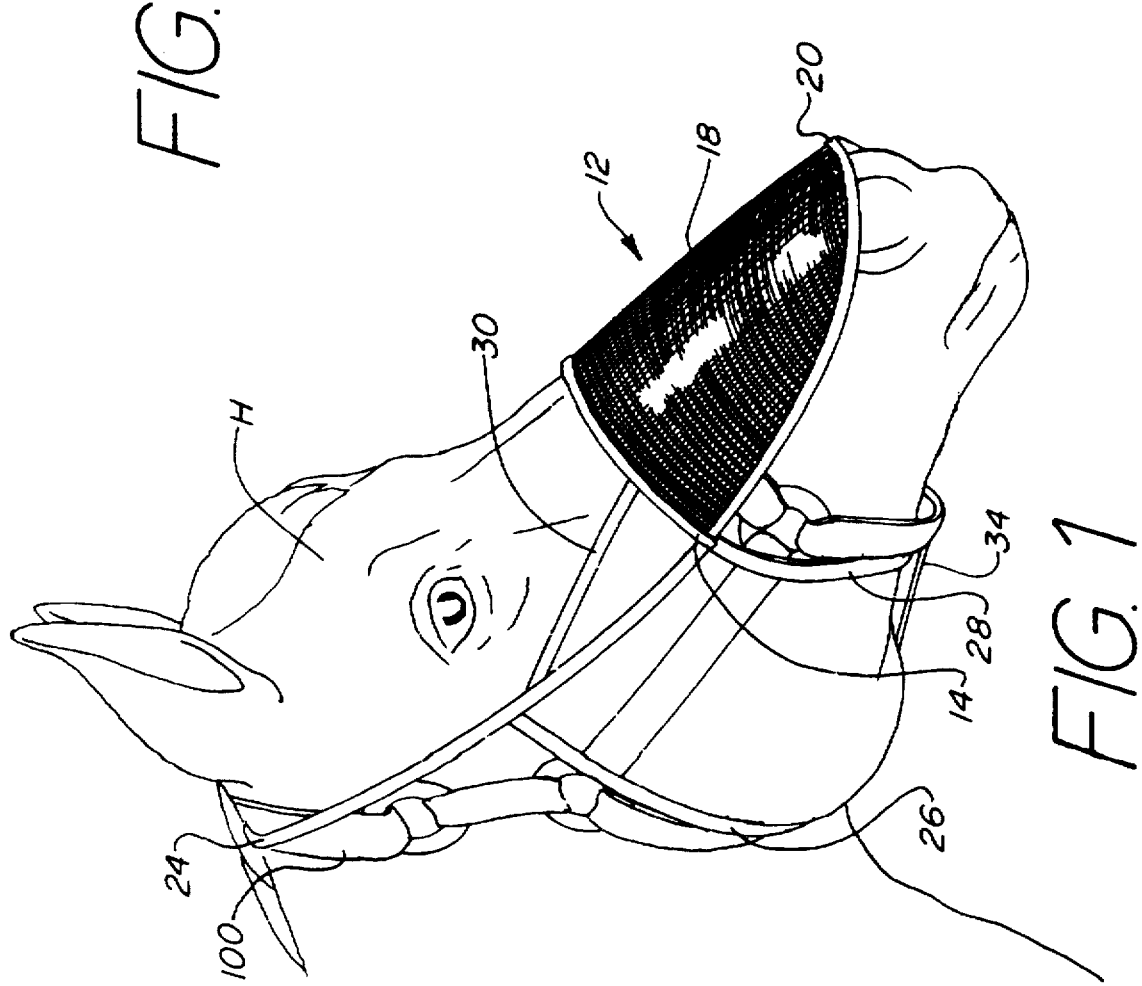

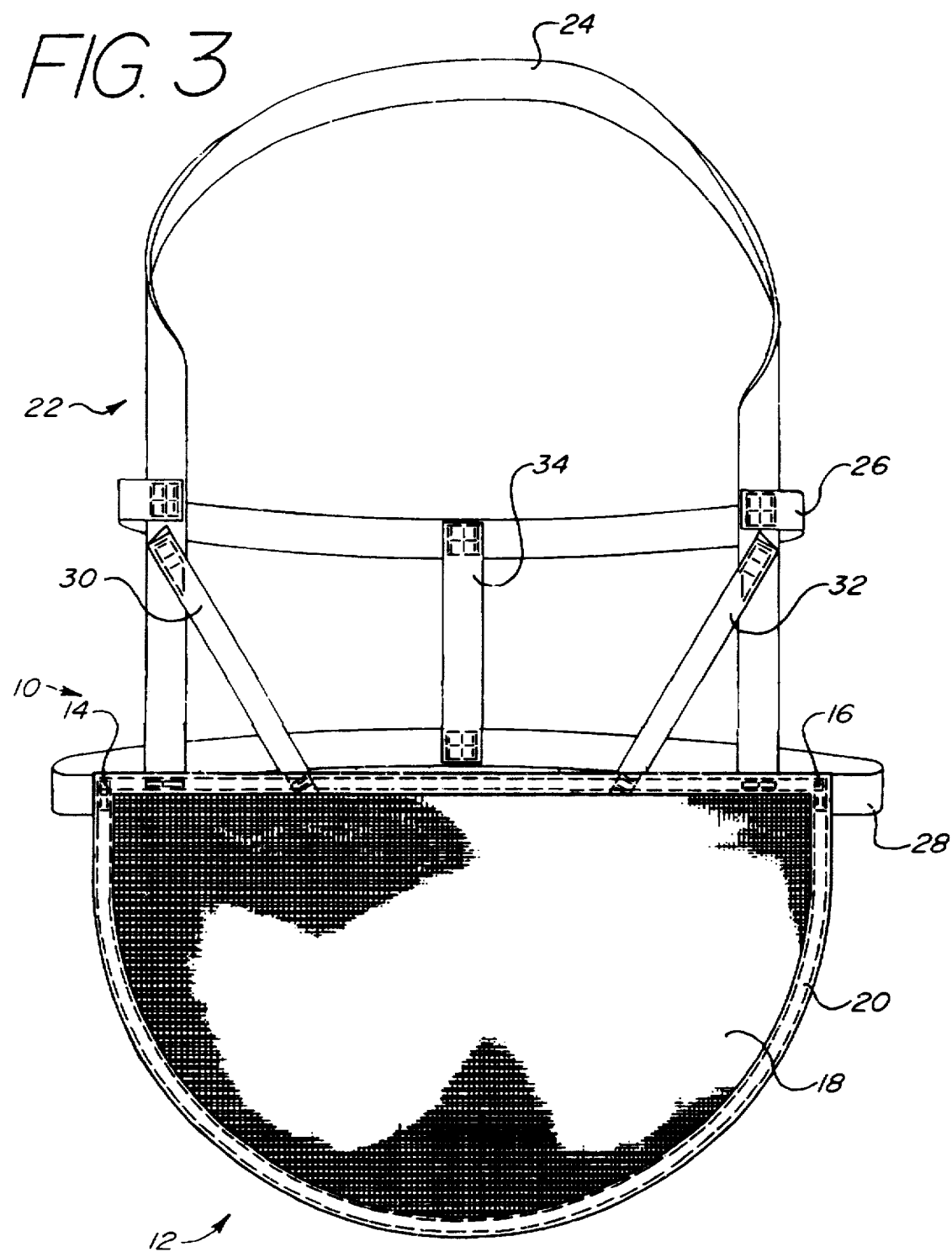

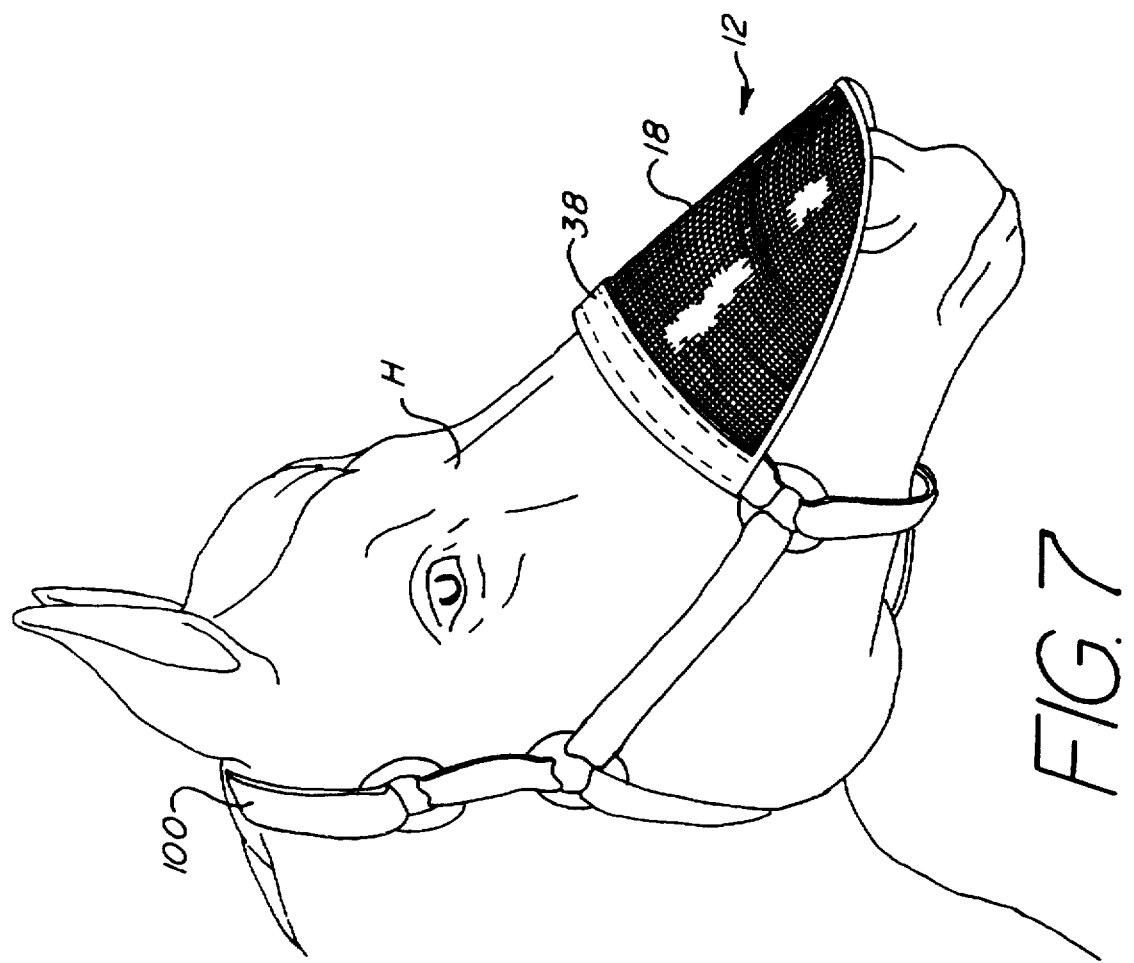

5,794,420

1

NOSE SHADE

BACKGROUND OF THE INVENTION

1. Field of the Invention

The present invention relates to a shade for protecting the nose of an animal from sun burn.

2. Background of the Prior Art

Many animals other than humans suffer from the harmful ultraviolet rays of the sun and get a sun burn. A horse can sun burn the bridge of its nose, especially a horse with a light colored bridge or one that spends prolonged periods of time in the sun. As with humans, a sun burned horse will suffer from its malady especially on the end of its nose.

Many devices have been proposed in order to protect a horse's nose from sun burn. Typical of such devices is U.S. Pat. No. 5,321,937 to Hamilton which was originally created for a different purpose but was adapted for ultraviolet ray protection. The Hamilton device as well as other devices known in the art all suffer from the same drawbacks. These devices are relatively bulky and can be difficult to place onto a horse. Once placed on the horse, it may be difficult to retain the device in proper position. The device may prove quite uncomfortable to a horse.

Therefore, there is a need in the art for a device that will protect a horse's nose from the sun's harmful rays. The device must be relatively light and simple. The device must be relatively easy to place onto a horse and must remain in position once so placed. The device should not be unduly burdensome to the horse. Ideally, such a device will be of simple and straightforward construction and should be relatively easy to clean and maintain.

SUMMARY OF THE INVENTION

The nose shade of the present invention addresses the aforementioned needs in the art. The nose shade is comprised of a scoop-shaped cover which has a webbing that is a mesh member. The webbing can have any desired light transmission capability value. The periphery of the webbing is encompassed by a bias tape. The cover is positionable over the lower part of a horse's nose terminating at the end of the nose.

In order to secure the cover in place, a retainer may be use. The retainer is comprised of a head stall extending from one corner of the cover to the over and positionable over the horse's head behind the ears. A throat strap, for preventing the head stall from riding upwardly, extends from a first medial point of the head stall to a second medial point of the head stall. A chin strap, for preventing the cover from riding upwardly, extends from one corner of the cover to the other. A pair of cheek straps extend from the cover to the head stall. A restriction strap connects between the chin strap and the throat strap. All straps are, advantageously, made from elastic material.

Alternately, the cover can be attached directly, either fixedly or removably, to a bridle, halter, or fly mask. A plurality of loops can be attached to the cover between the two corners such that the loops loop around the bridal or halter. Alternately, a flap can be attached to the cover between the two corners and the flap can be stitched, glued or otherwise fixedly secured to the bridle, halter, or fly mask. The flap may have hook and loop material thereon for removably mating with a corresponding portion of hook and loop material on the halter, bridle, or fly mask.

The nose shade provides a device that shields an animal's nose from the ultraviolet rays of the sun in varying degrees of protection. The device is of simple design and is straightforward to use. The device is easy to place onto a horse and will remain properly in place. The device is not uncomfortable to the animal.

BRIEF DESCRIPTION OF THE DRAWINGS

FIG. 1 is an isometric view of the horse shade of the present invention placed onto a horse.

FIG. 2 is a front elevation view of the horse shade placed on a horse.

FIG. 3 is a bottom plan view of the horse shade.

FIG. 7 is an isometric of a second alternate embodiment of the horse shade of the present invention.

Similar reference numerals refer to similar parts throughout the several views of the drawings.

DESCRIPTION OF THE PREFERRED EMBODIMENT

Figure 4:
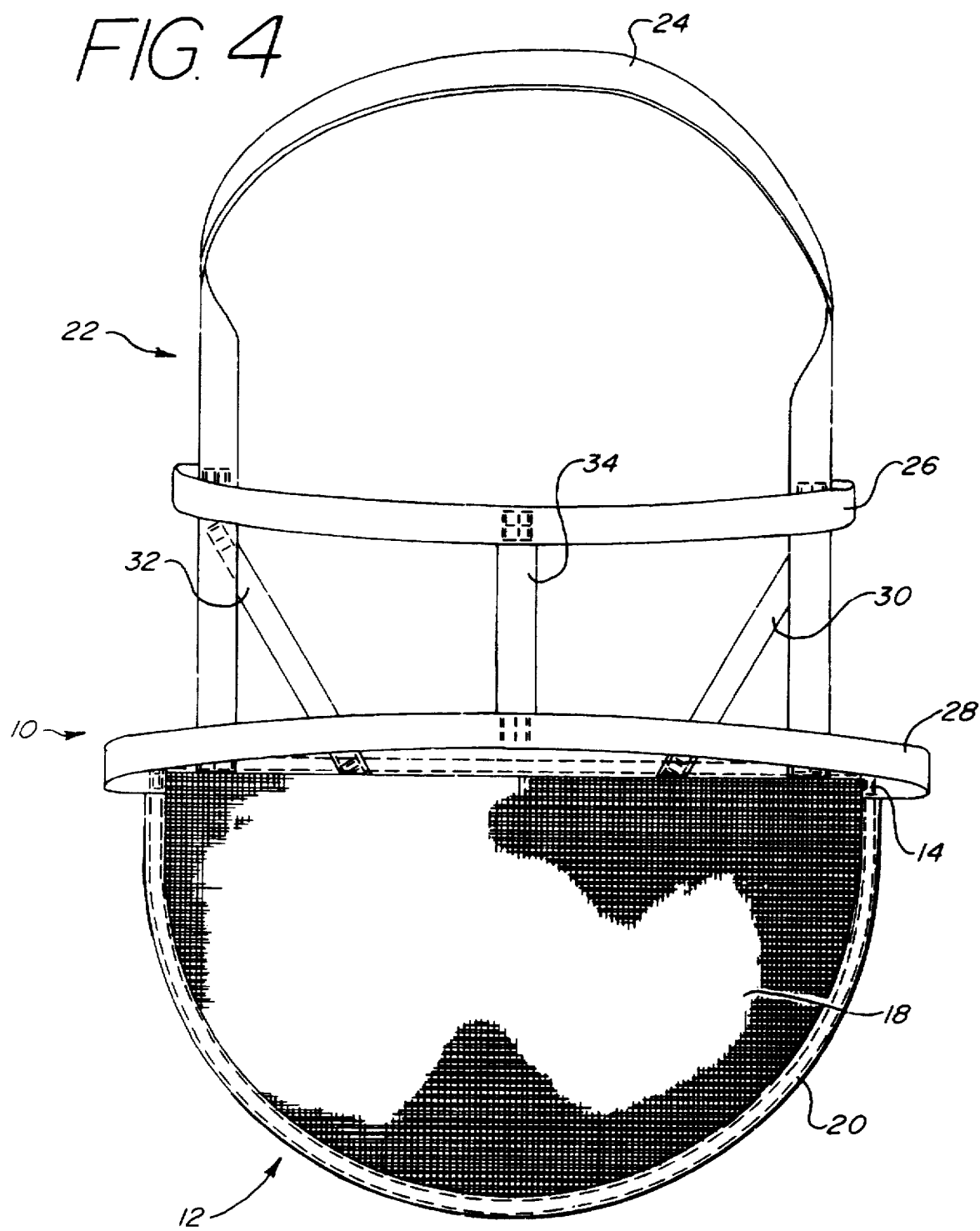
FIG. 4 is a top plane view of the horse shade.

Referring now to the drawings, it is seen that the horse shade of the present invention, generally denoted by reference numeral 10, is comprised of a generally scoop-shaped cover 12 that has a first corner 14 and a second corner 16. The cover 12 is comprised of a webbing 18 which is a mesh member. The webbing 18 can have any desired light transmission capability value. The desired value would depend, among other considerations, the typical amount of time a particular horse will spend in the sun. The sun's effective burning power in a particular area, and the sensitivity to sun burn of a particular horse. By employing a mesh member for the webbing 18, air is readily able to pass through the webbing 18 assuring that the horse H is not suffer from discomfort. Surrounding the outer periphery of the webbing 18 is a bias tape 20 which maintains the general scope shape of the cover 12.

A retainer 22 maintains the cover 12 in proper position on a horse H. As seen, the retainer 22 is comprised of a head stall 24 that secures to the cover 12 at the first corner 14, passes over the horse's H head behind the ears, and secures to the cover 12 at the opposite corner 16. The head stall 24 maintains the cover 12 in place on the horse's H nose.

A throat strap 26 secures to a medial point of the head stall 24, passes underneath the horse's H head proximate the throat, and secures to the head stall 24 at a second medial point. The throat strap 26 prevents the head stall 24 from riding over the horse's H ears.

A chin strap 28 attaches to the cover 12 at the first corner 14, passes underneath the horse's H chin, and attaches to the cover 12 at the opposite corner 16. The chin strap 28 prevents the cover 12 from riding up toward the horse's H eyes.

A first cheek strap 30 secures to the cover 12 at a medial point between the first corner 14 and the second corner 16. The opposite end of the first cheek strap 30 attaches to the head stall 24 at a point intermediate the first medial point of the head stall and the first corner 14. A second check strap 32 secures to the cover 12 at a point intermediate the second medial point of the head stall 24 and the second corner 16. The two cheek straps 30 and 32 prevent the cover 12 from flipping up toward the horse's H eyes.

One end of a restriction strap 34 attaches to a medial point on the chin strap 28 and the opposite end attaches to a medial point on the throat strap 26. The restriction strap 34 prevents the chin strap 28 from riding toward the horse's H mouth.

The head stall 24, the throat strap 26, the chin strap 28, the two check straps 30 and 32, and the restriction strap 34 are, advantageously, made from an elastic material, although non-elastic material may be used. Use of elastic material eliminates the need for adjustment buckles for proper fit, which reduces device cost and increases device comfort. The straps may be attached at their respective attachment points by any appropriate means including stitching and gluing.

The device 10 is fitted onto the horse H as illustrated in FIG. 1. The cover 12 prevents sun burn to the sensitive part of the horse's H nose. Ideally, the cover 12 terminates at the end of the nose. This gives maximum protection, yet does not interfere with the horse's breathing. Although the device 10 is illustrated as being fitted over the horse's H halter 100, the device can also be positioned underneath the halter 100.

Figure 6:
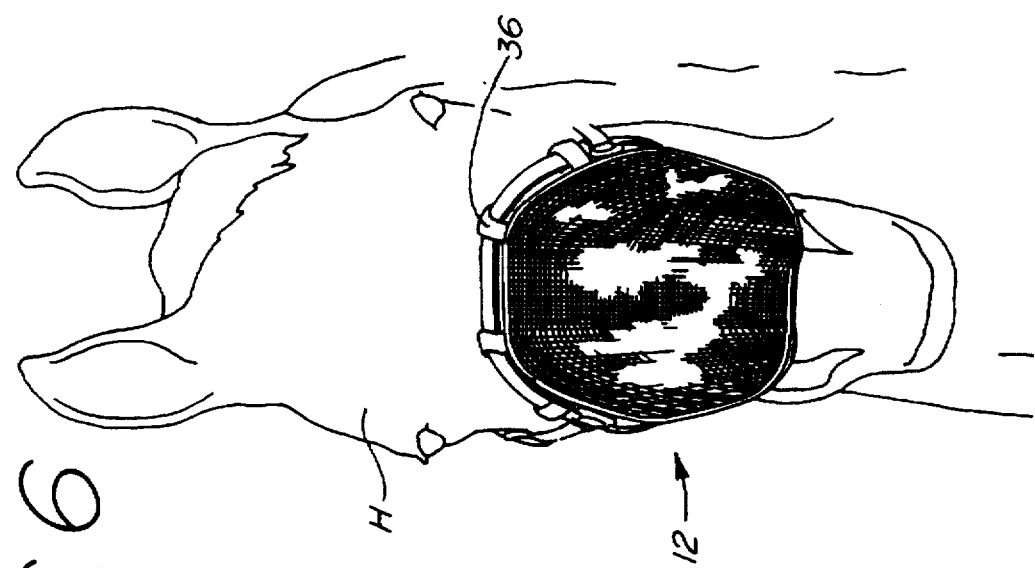
FIG. 6 is a front elevation view of the alternate embodiment of the horse shade.
Figure 5:
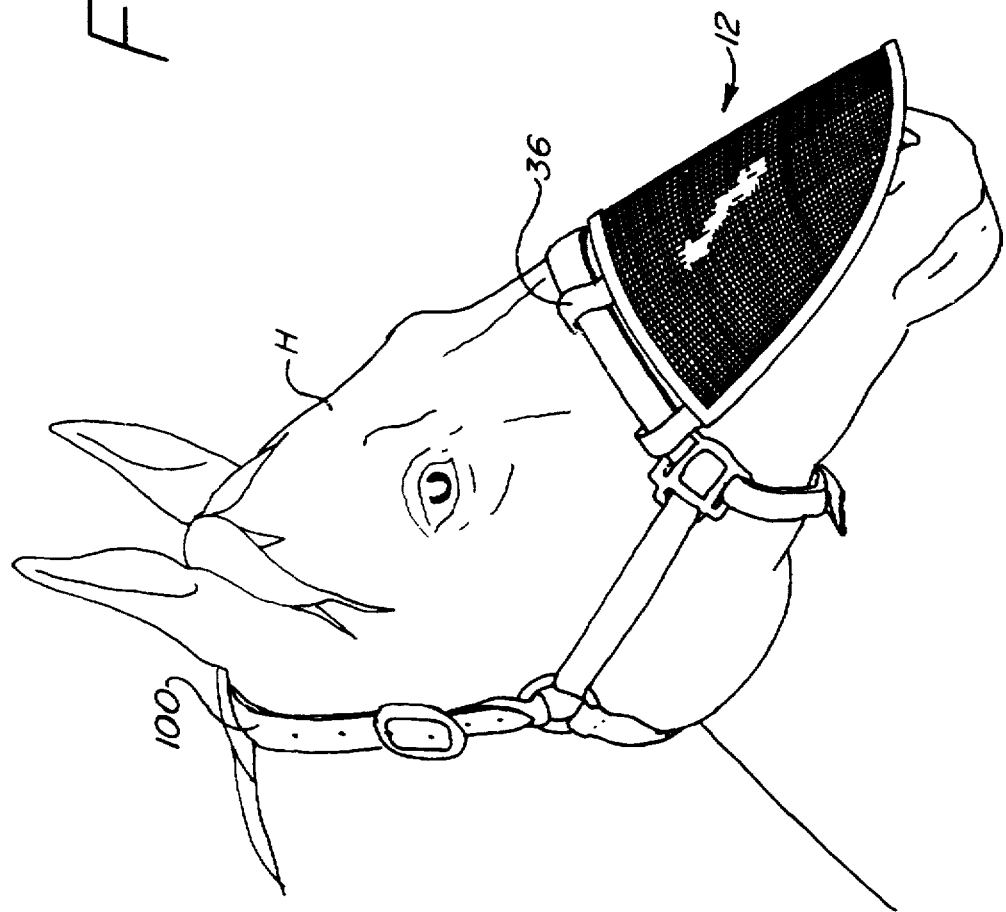
FIG. 5 is an isometric view of an alternate embodiment of the horse shade of the present invention.

In an alternate embodiment of the nose shade of the present invention the cover 12 can attach directly to the halter 100, or bridle or fly mask. As seen in FIGS. 5 and 6, the cover 12 has a plurality of loops 36 extending from the cover 12 between the first corner 14 and the second corner 16. The loops 36 loop around the halter 100.

As seen in FIG. 7, a flap 38 secures to the cover 12 and extends between the first corner 14 and the second corner 16. The flap 38 attaches to the halter 100 either fixedly by stitching, gluing or the like, or removably by the use of cooperating hook and loop material and the like.

While the invention has been particularly shown and described with reference to an embodiment thereof, it will be appreciated by those skilled in the art that various changes in form and detail may be made without departing from the spirit and scope of the invention.

I claim:

1. A shade for protecting an animal's nose from the sun comprising:

a scooped-shaped cover having a webbing with the outer periphery encompassed by a bias tape and having a first corner, a second corner, and a first medial portion therebetween;

a first strap having a first end attached to the first corner, a second end attached to the second corner, a second medial portion, and a third medial portion;

a second strap having a third end attached to the second medial portion, a fourth end attached to the third medial portion, and a fourth medial portion;

a third strap having a fifth end attached to the first corner, a sixth end attached to the second corner, and a fifth medial portion;

a fourth strap having a seventh end attached to the first medial portion and an eighth end attached to the first strap intermediate the second medial portion and the first end;

a fifth strap having a ninth end attached to the cover intermediate the fourth strap and the second corner and a tenth end attached to the first strap; and a sixth strap having an eleventh end attached to the fourth medial portion and a twelfth end attached to the fifth medial portion.

2. The device as in claim 1 wherein the first strap, the second strap, the third strap, the fourth strap, the fifth strap, and the sixth strap are made from an elastic material.

3. The device as in claim 1 wherein the securement means is comprised of a plurality of loops attached to the cover between the first corner and the second corner.

4. The device as in claim 1 where in the securement means is comprised of a flap attached to the cover and extending from proximate the first corner to proximate the second corner.

5. The device as in claim 4 wherein the flap can be fixedly secured to a bridle, halter, or fly mask.

6. The device as in claim 5 wherein the fixed securement can be achieved by stitching the flap to the bridle, halter, or fly mask.

7. The device as in claim 5 wherein the fixed securement can be achieved by gluing the flap to the bridle, halter, or fly mask.

8. The device as in claim 4 wherein the flap can be removably secured to a bridle, halter, or fly mask.

9. The device as in claim 4 further comprising a portion of cooperating hook and loop material attached to the flap.

10. A shade for protecting an animal's nose from the sun comprising:

a scooped-shaped cover having a webbing with the outer periphery encompassed by a bias tape and having a first corner, a second corner, and a first medial portion therebetween; and a flap attached to the cover and extending from proximate the first corner to proximate the second corner.

11. The device as in claim 10 wherein the securement means is comprised of a retainer.

12. The device as in claim 11 wherein the retainer is comprised of:

a first strap having a first end attached to the first corner, a second end attached to the second corner, a second medial portion, and a third medial portion;

a second strap having a third end attached to the second medial portion, a fourth end attached to the third medial portion, and a fourth medial portion;

a third strap having a fifth end attached to the first corner, a sixth end attached to the second corner, and a fifth medial portion;

a fourth strap having a seventh end attached to the first medial portion and an eighth end attached to the first strap intermediate the second medial portion and the first end;

a fifth strap having a ninth end attached to the cover intermediate the fourth strap and the second corner and a tenth end attached to the first strap; and a sixth strap having an eleventh end attached to the fourth medial portion and a twelfth end attached to the fifth medial portion.

13. The device as in claim 12 wherein the first strap, the second strap, the third strap, the fourth strap, the fifth strap, and the sixth strap are made from an elastic material.

14. The device as in claim 10 wherein the securement means is comprised of a plurality of loops attached to the cover between the first corner and the second corner.

15. The device as in claim 10 wherein the flap can be fixedly secured to a bridle, halter, or fly mask.

16. The device as in claim 15 wherein the fixed securement can be achieved by stitching the flap to the bridle, halter, or fly mask.

17. The device as in claim 15 wherein the fixed securement can be achieved by gluing the flap to the bridle halter, or fly mask.

18. The device as in claim 10 wherein the flap can be removably secured to a bridle, halter, or fly mask.

19. The device as in claim 10 further comprising a portion of cooperating hook and loop material attached to the flap.

* * * * *